(12) United States Patent
Yue et al.

(10) Patent No.: US 8,601,470 B2
(45) Date of Patent: Dec. 3, 2013

(54) SYMBIOTIC SMART PERIPHERALS

(75) Inventors: Kelvin Kam-Suen Yue, Sunnyvale, CA (US); Monica Sin-Ling Lam, Menlo Park, CA (US); Thomas J. Purtell, San Francisco, CA (US)

(73) Assignee: Moka5, Inc., Redwood City, CA (US)

( * ) Notice: Subject to any disclaimer, the term of this patent is extended or adjusted under 35 U.S.C. 154(b) by 1268 days.

(21) Appl. No.: 11/970,479

(22) Filed: Jan. 7, 2008

(65) Prior Publication Data

US 2008/0168188 A1 Jul. 10, 2008

Related U.S. Application Data

(60) Provisional application No. 60/883,746, filed on Jan. 5, 2007.

(51) Int. Cl.
*G06F 9/455* (2006.01)
*G06F 9/445* (2006.01)
*G06F 3/00* (2006.01)

(52) U.S. Cl.
USPC .................................. 718/1; 717/174; 710/8

(58) Field of Classification Search
None
See application file for complete search history.

(56) References Cited

U.S. PATENT DOCUMENTS

| | | | |
|---|---|---|---|
| 6,249,825 B1 * | 6/2001 | Sartore et al. ...................... | 710/8 |
| 6,986,030 B2 * | 1/2006 | Shmueli et al. .................... | 713/1 |
| 7,779,403 B2 * | 8/2010 | Kao et al. ........................ | 717/169 |
| 8,091,084 B1 * | 1/2012 | Dobrovolskiy et al. ....... | 717/174 |
| 2003/0051084 A1 * | 3/2003 | Rosen .............................. | 710/72 |
| 2003/0084085 A1 * | 5/2003 | Breidenbach et al. ........... | 709/1 |
| 2003/0093768 A1 * | 5/2003 | Suzuki .......................... | 717/100 |
| 2005/0080937 A1 | 4/2005 | Cota-Robles et al. | |
| 2005/0240685 A1 * | 10/2005 | Keys .................................. | 710/8 |
| 2006/0070085 A1 * | 3/2006 | Bao et al. ...................... | 719/319 |
| 2006/0101189 A1 | 5/2006 | Chandrasekaran et al. | |
| 2006/0161719 A1 * | 7/2006 | Bennett et al. ..................... | 711/6 |
| 2006/0206628 A1 * | 9/2006 | Erez ................................... | 710/8 |
| 2006/0277542 A1 | 12/2006 | Wipfel | |
| 2007/0006205 A1 | 1/2007 | Kennedy et al. | |
| 2007/0089111 A1 | 4/2007 | Robinson et al. | |
| 2007/0113228 A1 * | 5/2007 | Raghunath et al. .............. | 718/1 |
| 2007/0162521 A1 | 7/2007 | Raghunath | |
| 2007/0198713 A1 | 8/2007 | Tsao et al. | |
| 2007/0209035 A1 * | 9/2007 | Sonderegger et al. ........... | 718/1 |
| 2008/0104588 A1 | 5/2008 | Barber et al. | |
| 2008/0162785 A1 * | 7/2008 | LaPedis et al. .............. | 711/103 |

FOREIGN PATENT DOCUMENTS

| | | |
|---|---|---|
| JP | 2006072591 A | 3/2006 |
| WO | 2006/036277 A2 | 4/2006 |
| WO | 2007/149671 A2 | 12/2007 |

* cited by examiner

*Primary Examiner* — Meng An
*Assistant Examiner* — Tammy Lee
(74) *Attorney, Agent, or Firm* — Park, Vaughan, Fleming & Dowler LLP

(57) ABSTRACT

Systems and methods for augmenting the functionality of a device using a virtual machine monitor is provided. In general, in one aspect, a computer implemented method is provided. The computer implemented method includes launching a virtual machine monitor on a host device and for a peripheral device. The virtual machine monitor comprises one or more software components capable of performing actions including connecting a peripheral device to a host device, where the peripheral device memory includes peripheral device specific software and one or more available software bundles. The software components can launch the virtual machine monitor for the peripheral device and execute the peripheral device-specific software and an available software bundle on the host device. In one implementation, the computer implemented method includes connecting a peripheral device to a host device, where the peripheral device memory includes peripheral device-specific software that is executed on the host device.

12 Claims, 10 Drawing Sheets

SYMBIOTIC SMART PERIPHERALS

CROSS-REFERENCE TO RELATED APPLICATIONS

This application claims the benefit under 35 U.S.C. §119(e) of U.S. Patent Application No. 60/883,746, filed Jan. 5, 2007, which is incorporated herein by reference.

BACKGROUND

This specification relates to augmenting the functionality of a device using a virtual machine monitor.

A virtual machine is a software construct that appears to be hardware on which a guest operating system and applications can be installed. In an emulator implementation, the virtual machine is an emulator, simulating all of the hardware used by the guest operating system and applications. In para-virtualization, the virtual machine allows the guest operating system and applications to run on the host hardware, but requires that the guest operating system be modified to use a special API (application programming interface) to run on the virtual machine monitor. In machine-level or full virtualization, the virtual machine allows a guest operating system that is implemented for the underlying host processor to be run without modification.

In a para-virtualization or a machine-level virtualization implementation, a virtual machine monitor is used to bind the virtual machine to the underlying host hardware. In some architectures, the virtual machine monitor runs directly on the host hardware in a hypervisor configuration. In others, it runs as an application on the host operating system.

Platform virtualization can be performed on a given hardware platform by host software (e.g., a control program), which creates a simulated computer environment (e.g., a virtual machine) for its guest software. The guest software functions as though it were installed on a stand-alone hardware platform. Platform virtualization includes the virtualization of specific system resources, such as storage volumes, name spaces, and network resources.

Additional software is often needed by a guest device using a virtual machine in a host device environment to augment the capabilities of the guest device. The additional software, however, is not always available in the host device environment.

SUMMARY

In general, in one aspect, a computer-implemented method is provided. The computer-implemented method includes launching a virtual machine monitor on a host device and for a peripheral device. The virtual machine monitor comprises one or more software components capable of performing actions including connecting a peripheral device to a host device, where the peripheral device memory includes peripheral device-specific software and one or more available software bundles. The software components can additionally launch the virtual machine monitor for the peripheral device and on the host device. The virtual machine monitor can comprise one or more software components capable executing the peripheral device-specific software and an available software bundle on the host device.

Embodiments of this aspect can include apparatus, systems, and computer program products.

Implementations of the method, computer program product and system can optionally include one or more of the following features. One or more host device or peripheral device capabilities can be identified. Additionally, a list of additional peripheral device specific software and one or more additional software bundles can be provided, the list being based upon at least one of an available resource, a functionality, an identified host device capability, or an identified peripheral device capability.

Additional peripheral device specific software and one or more additional software bundles executable on the host device and not available in the memory on the peripheral device can be identified and updated. User-specific content and configuration data can be stored. Additional peripheral device specific software and the one or more available and additional software bundles can be presented to the user.

In one implementation, the computer implemented method includes connecting a peripheral device to a host device, where the peripheral device memory includes peripheral device-specific software that is executed on the host device.

Particular embodiments of the subject matter described in this specification can be implemented to realize one or more of the following advantages. Using a symbiotic smart device ("SSD") comprising SSD platform software (e.g., a LivePC™ Engine like that manufactured and distributed by Moka5 of Redwood City, Calif. and available from http://www.moka5.com), the functionality of consumer electronics devices and other devices are augmented by leveraging resources (e.g., CPU, network, storage) available to a common personal computer.

In some implementations, when the peripheral device containing the SSD is plugged into a host device, the SSD platform software can provide access to one or more specific SSD functions without any further user interaction. The SSD software can provide additional functionalities for the user that may otherwise be unavailable using the resources of the host device. Since the SSD software can include additional device-specific code (e.g., in SSD storage), device manufacturers do not need device-specific support from the host device or the SSD platform software. Additionally, device storage both the SSD platform and the SSD platform software can be updated from the network. Using virtualization technology, unmodified device-specific applications and device drivers can be enhanced to function properly while running directly from the SSD. Product documentation can also be included with a peripheral device, such that an SSD can facilitate user interaction with the peripheral device for a specific task and facilitate completion of the task by the host device using the peripheral device.

Host devices can provide resources (e.g., network connectivity, faster processors, large displays, or input devices), that make peripheral devices more useful. Peripheral devices can provide functionalities (e.g., cameras, microphones, or joysticks), that increase the utility of the host device. When a host device does not include the software (e.g., device drivers), necessary to implement one or more peripheral device functionalities, the necessary software can be implemented as a portable application, (e.g., run from an external storage device), without requiring the portable application to be installed on the host device. Some software (e.g., a device driver) is not portable, and may need to be installed on the host before it can be run. One way to make software portable is to encapsulate it in a virtual machine.

For host devices, the SSD platform allows users to automatically get updates and seamlessly acquire new software, creating a more usable and reliable host device in addition to a more user-friendly experience. Additionally, device integrators are better able to ensure greater customer satisfaction with minimal support burden.

For peripheral devices, the device-specific software a user needs to use their peripheral device can be available wherever the user goes. The SSD platform can enable powerful, graphical user interfaces that can configure the peripheral devices. With the SSD platform, the peripheral device can include device-specific hardware and software, minimizing the burden of searching for the specific hardware and software needed to facilitate using the peripheral device to perform particular tasks using the software bundles. The peripheral device storage can include user-specific content and configuration data, such that once the peripheral device is disconnected from the computer, the peripheral device can use the stored content and configuration data for future user operations.

Virtualizing a file system or disk interface for peripheral device software lends important features to the SSD platform, such as controlled access to user data and execution of an application during download (e.g., by redirecting reads originally intended for the local disc to the network). Alternatively, application and operating system virtualization techniques (softricity, virtuozzo, mojopac, etc.), can be used to facilitate the implementation of unmodified non-portable applications from peripheral device storage. Thus, complete software stacks required for implementing a particular peripheral device can be pre-qualified.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
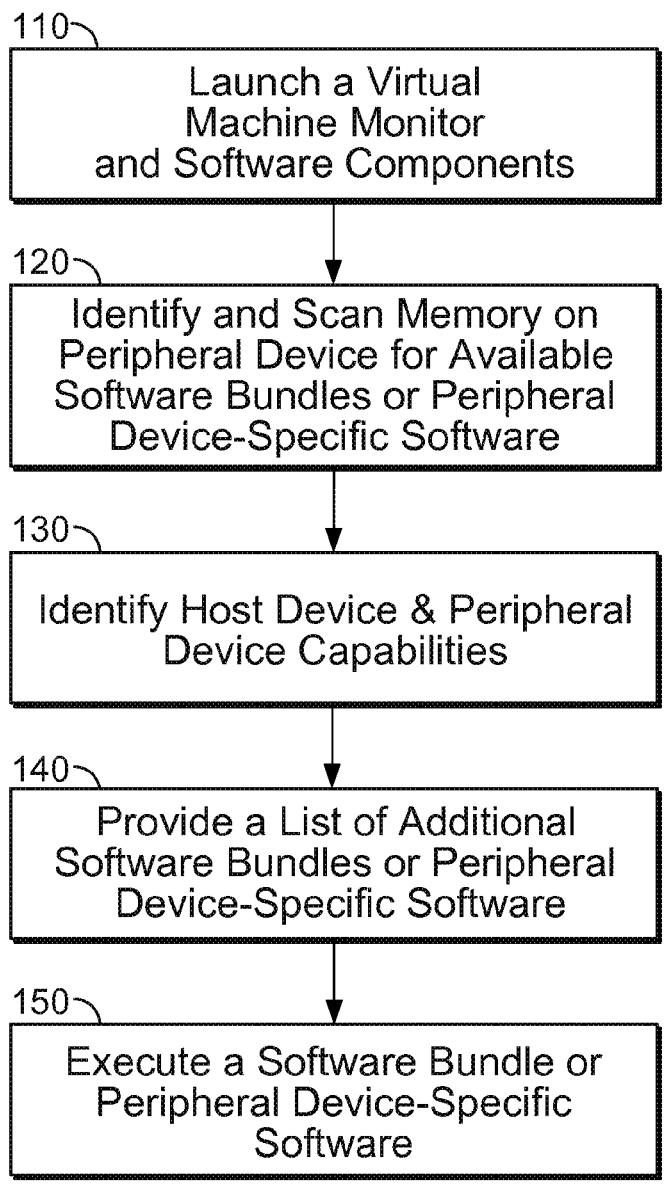
FIGS. 1A and 1B are example methods for augmenting the functionality of a device using an SSD.
Figure 1B:
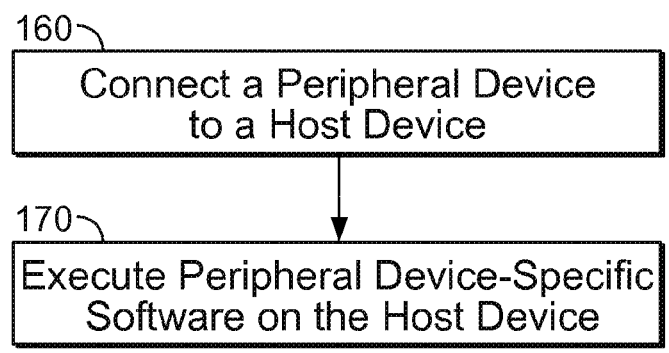

FIGS. 1A and 1B are example methods for augmenting the functionality of a device using an SSD. For convenience, the methods will be described with reference to a system that performs the method.

Figure 2A:
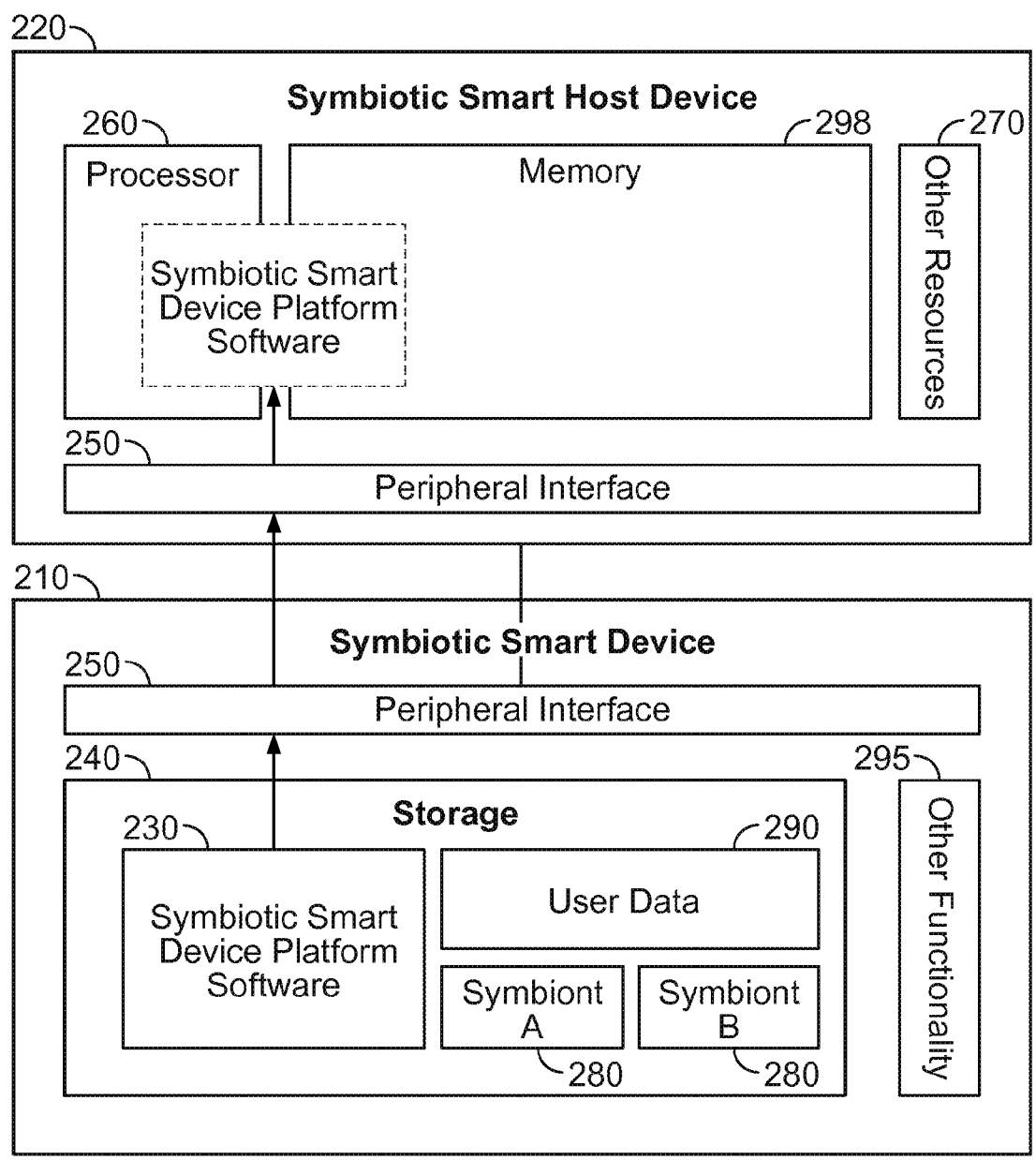
FIGS. 2A-2C illustrate a concept for how an SSD operates.
Figure 2B:
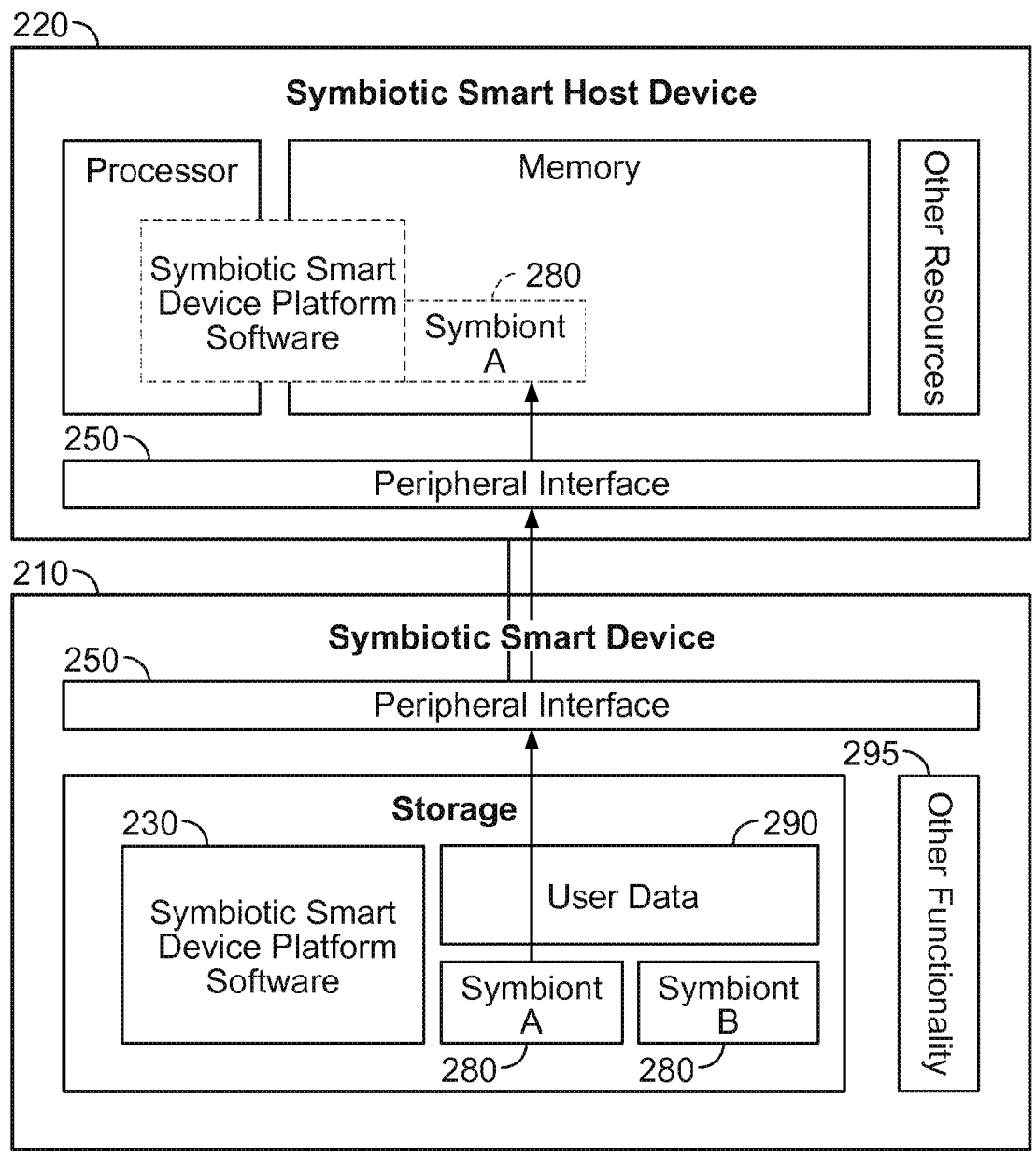
Figure 2C:
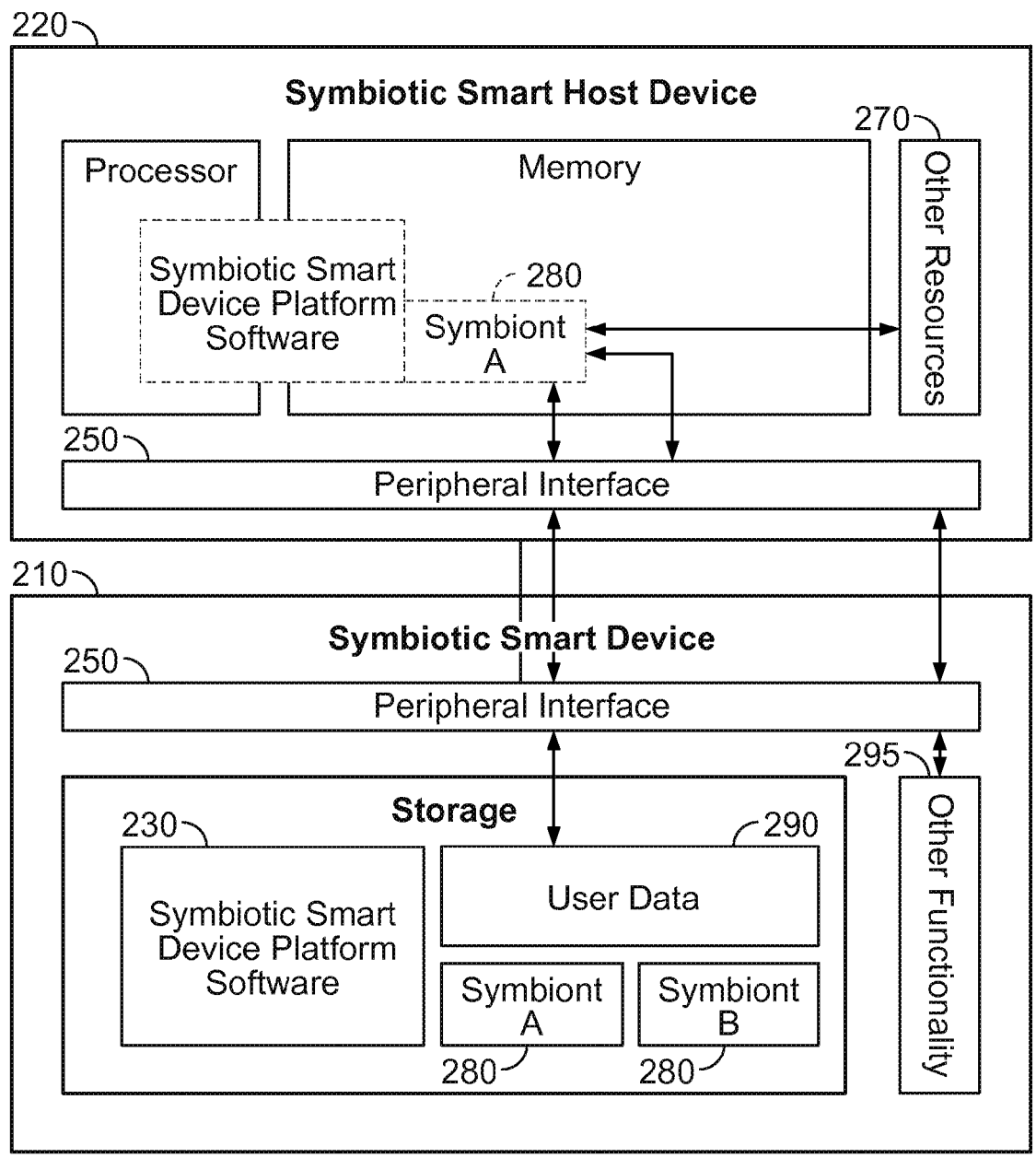

FIGS. 2A-2C illustrate a concept for how an SSD operates. FIG. 2A shows an example SSD which has a connector or wireless transceiver (e.g., USB or USB wireless interface) that allows the SSD to interface with a host device 220. An SSD can include data storage 240 (e.g., USB mass storage class device), and other data (e.g., user data 290) which can be transmitted over a peripheral interface 250. The peripheral interface 250 can be operable for coupling to a peripheral device 210 (e.g., a removable peripheral device). The data storage 240 can contain SSD platform software 230 (e.g., FAT file-system with software preloaded). The data storage 240 can read the SSD platform software 230 and write updates to the SSD platform software 230. An SSD can provide unique identifying information (e.g., a USB device serial number), indicating the existence of software licenses. The SSD will also be referred to as a peripheral device for the remainder of the description.

A peripheral device 210 can be any device capable of communicating with another device (e.g., a host device 220). A removable peripheral device 210 can be operable to store a portable computing environment. Examples of peripheral devices 210, can include, but are not limited to portable storage devices, game controllers, headsets, webcams, optical media drives, musical instruments, keyboards, mice, microphones, television tuners, digital cameras, video cameras, stereo receivers, audio receivers, cellular phones (and any other device utilizing cellular technology), scanners, headphones, printers, personal health monitors (and any other health related monitoring apparatus), and PIN pads.

SSD platform software 230 can be located in any peripheral device. In some implementations, the SSD platform software 230 is located within the storage 240 (e.g., memory or hard disk) on a peripheral device 210. When the peripheral device 210 is attached to a host device 220 (e.g., a host computer), the SSD platform software 230 is loaded from the peripheral device's storage 240 onto the host device 220 over the peripheral interface 250. The SSD platform software 230 is then launched 110 on the host device 220, as shown in FIG. 1A. The SSD platform software 230 can include a virtual machine monitor that runs on host device 220. Alternatively, the virtual machine monitor can be pre-installed on a host device 220.

The symbiotic smart host device 220, can be any device capable of communicating with another device (e.g., a peripheral device). Examples of a host device 220 can include, but are not limited to, personal computers, personal digital assistants, and cellular telephones. Host device 220 can include a peripheral interface connector cable or wireless transceiver (e.g., Firewire, Ethernet, USB interface, or USB wireless interface), capable of supporting data transfers to and from the peripheral device 210. Host device 220 can also include system software (e.g., Windows XP or modern PC BIOS), capable of accessing data storage 240 exposed over the peripheral interface 250.

In some implementations, host device 220 can include software that can automatically launch (e.g., by default), a designated or selected (e.g., by the system or the user) computer program (e.g., Windows XP autorun function), located in the memory 298. Additionally, in some implementations, host device 220 can include a network connection (e.g., DSL, cable, dialup, LAN, VPN, cellular, or WiFi), to enable features of the SSD platform software 230 (e.g., acquiring updates, acquiring remote user data, or exposing device functionalities to other devices accessible using the network connection).

A host device 220 can include a processor 260 (e.g., an x86 processor in a Dell computer) and one of more user input devices (e.g., a keyboard, mouse, or touchpad). The processor 260 can be coupled to the peripheral interface 250 and the processor 260 can be operable for running a native environment. The host device 220 can also include a memory 298 for storing instructions which when executed by the processor 260 cause the processor to perform certain operations (e.g., launching the virtual machine monitor on the SSD). In some implementations, a host device 220 can include data or hardware that defines what software has been licensed for exclusive use on a host device 220. In some implementations, a host device 220 can maintain additional resources 270 unavailable on a peripheral device 210. For example, a greater amount of RAM and more CPU cycles are often available on a host device 220 (e.g., personal computer) than would be available on the microcontrollers embedded in a peripheral device 210 (e.g., consumer electronics device). Additionally, in some implementations, a host device 220 can include graphics processing hardware.

In some implementations, when a peripheral device 210 is attached (e.g., with a cable or wirelessly), to a host device 220, the peripheral device 210 automatically transmits peripheral device 210 data to the host device 220. For example, the peripheral device 210 can transmit data regarding the existence of the peripheral device data storage 240 along with peripheral device-specific features (e.g., peripheral device type or particular peripheral device use cases). In some implementations, the data storage 240 in the peripheral device 210 can contain one or more symbiont images 280 or "software bundles" (e.g. a LivePC, an MSI installation file), which can facilitate the implementation of use cases specific to the peripheral device 210. As peripheral devices 210 and host devices 220 can support numerous software formats, many software bundle 280 formats are possible.

A software bundle 280 can include an operating environment, application software (e.g., peripheral device-specific software), configuration settings, user data (e.g., from previous user interaction with the particular software bundle), code, libraries, or device drivers capable of providing the user with the ability to use the device for a particular use case. In one implementation, a software bundle 280 can optionally include metadata that indicates the licensing requirements for the software bundle 280 in addition to code for instructing the user on specific use cases related to the specific software bundle 280. A different software bundle 280 can exist and be installed upon each host device 220 based on the host device 220 architecture (e.g., a cell phone version of the software bundle 280 for a cell phone architecture or personal computer version of the software bundle 280 for a personal computer architecture).

The peripheral device 210 includes code (e.g., software) for using the peripheral device 210 with the host device 220 (e.g., when the code is not already installed on the host device 220). In some implementations, as shown in FIG. 1B, software specific to a peripheral device can be a portable application (e.g., an application capable of running without installation) that is implemented (e.g., executed) 170 when the peripheral device 210 is connected 160 to the host device 220. For example, the peripheral device-specific software can be software that is not installed on the host device 220, such that when the peripheral device 210 is connected 160 to the host device 220, the peripheral device-specific software is executed 170 on the host device 220. The peripheral device-specific software can include device-specific drivers and other software for implementing one or more peripheral device specific features or functionalities.

In other implementations, software specific to a peripheral device can be a portable application that is implemented by including the peripheral device-specific software in a virtual machine. In some implementations, the software to run a virtual machine can be included in the peripheral device storage 240 such that when the peripheral device 210 is connected to the host device 220, the peripheral device-specific software can be executed on the host device 210 (e.g., either alone or in addition to a software bundle 280) from the peripheral device storage 240. In other implementations, the software to run a virtual machine (e.g., a virtual machine monitor), can be pre-installed on the host. In some implementations, the peripheral device-specific software can include components (e.g., code), capable of checking (e.g., scanning) the host device 220 (e.g., for host device characteristics and capabilities), and selecting available software on the peripheral device 210 compatible with the host device 210.

The SSD platform software 230 need not be specific to any particular feature of the peripheral device 210 and the peripheral device storage 240 can always be updated with improvements to the SSD platform software 230, updates to the software bundles 280, or updated peripheral device-specific code. The data storage 240 can read the software bundles 280 and write updates to the software bundles 280 (e.g., for particular use cases).

For example, the software bundle format can rely on machine level virtualization (e.g., the virtual machine bundles used by VMWare's VMPlayer platform). The software bundles 280 can comprise two virtual disks (e.g., one for the software and one for user data) and configuration files that indicate the precise feature set of a virtual machine capable of booting the image. The SSD platform software 230 can be improved by adding support for a portable application bundle format. As noted above, a "portable application" is an application that will run from the peripheral device storage 240 (e.g., without requiring that the application be explicitly installed on the host device). In some implementations, a portable application can restrict privileges (e.g., reads and writes), to application code and directory settings (e.g., for the directory in which the application is located). The portable software bundle format for the software bundle 280 can be a directory on the file-system located in the peripheral device storage 240. Thus, by using a variety of software bundles 280 which include the parameters needed to facilitate the way in which an application is made portable, SSD platform software 230 can be enhanced to include operating system virtualization technology which makes non-portable applications appear to be portable applications.

As shown in FIG. 2B, after the attachment of a peripheral device 210 to the host device 220, using the peripheral interface 250, the SSD platform software 230 loads a particular software bundle 280 onto the host device 220 for execution on the host device 220. In some implementations, the software bundles 280 are run from the SSD platform software 230 without being completely copied onto the host device 220. For example, the SSD platform software 230 can be run on the host device 220 from the peripheral device storage 240.

When a software bundle 280 has been loaded onto the host device 220 (e.g., into memory or the cache, or both), the host device 220 can execute the software bundle 280 while concurrently interacting with other resources 270 available on the host device 220 in addition to user data 290 and other functionalities 295 available on the peripheral device 210. This interaction is shown in FIG. 2C and can include virtualizing the resources, directly using the resources, and emulating other resources using available resources. This interaction can provide higher level services to the software bundles 280. Details regarding the individual steps enumerated above will be described in greater detail below with respect to the individual components which can comprise the SSD platform software 230 and can perform the individual steps.

Figure 3:
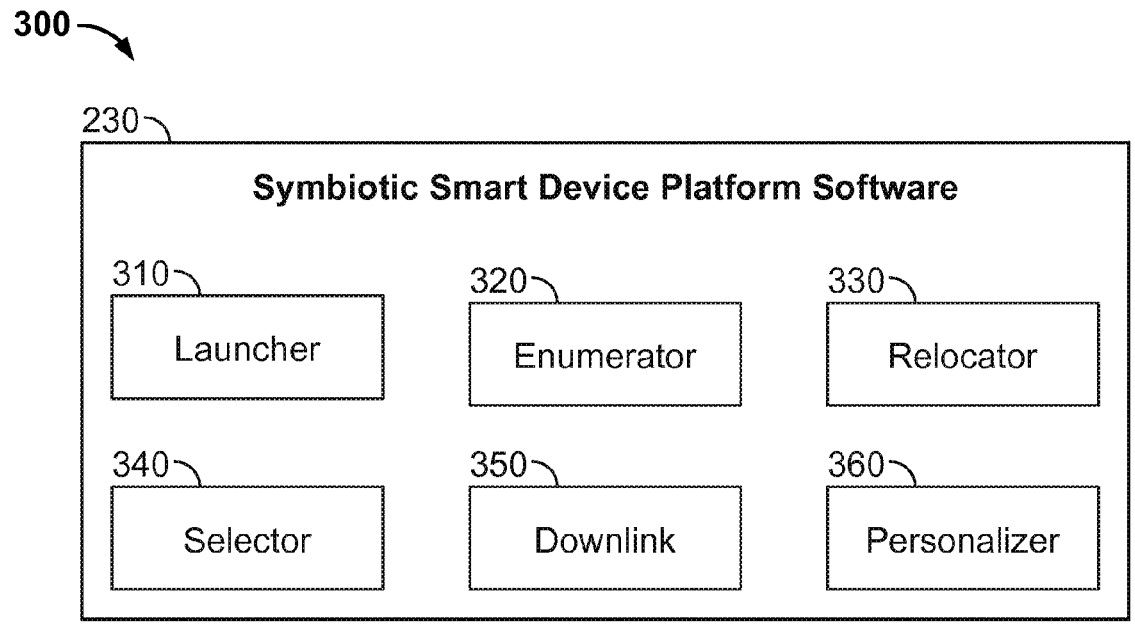
FIG. 3 illustrates the SSD platform software.

The SSD platform software 230 that is launched on the host device 220 can include a virtual machine monitor comprising numerous software components. FIG. 3 illustrates the SSD platform software 300 in accordance with one implementation of the invention. In some implementations, the SSD platform software 230 is the engine that runs software bundles 280 and peripheral device-specific software from the peripheral device storage 240 using host device 220 computing resources, other functionalities 295 located on the peripheral device 210, and available network resources as will be described below. SSD platform software 230 can include the symbiont smart device platform launcher 310, the symbiont enumerator 320, the symbiosis relocator 330, the symbiosis selector 340, the symbosis downlink 350, and the symbosis personalizer 360.

SSDP Launcher

The symbiotic smart device platform launcher 310 ("launcher") is a software component in the SSD platform software 230 which can be located on a peripheral device 210. As shown in FIG. 2A, the launcher 310 is capable of identifying and scanning 120 the memory or storage 240 (e.g., non-volatile memory), on the peripheral device 210 for one or more available software bundles 280 and peripheral device-specific software. The launcher 310 is further capable of initiating the execution of software bundles 280 for a particular use case of the peripheral device 210. The launcher 310 is also capable of checking for and acquiring (e.g., downloading) available SSD platform software 230 updates for use with software bundles 280. In one implementation the launcher 310 runs automatically when the peripheral device 210 is connected (e.g., to a host device 220). In one implementation, the launcher 310 can use the enumerator 320 to generate a list of software bundles 280 (e.g., for use with one or more use cases). The generation of the list of software bundles 280 will be described in greater detail below with respect to the symbiont enumerator 320.

In one implementation, the launcher 310 can provide the list of software bundles 280 to the selector 340, and the selector 340 can display a user interface allowing the user to pick the way in which to use the peripheral device 210. In other implementations, the launcher 310 can automatically select a use case (e.g., if only one use is available that use may be automatically selected, or if only one use has ever been selected by the user that use may be automatically selected). The launcher 310 can launch the software required for the use case from the storage 240 in the peripheral device 210 or from a cache (e.g., located on storage devices accessible to the host device 210). For example, a set of cryptographic hashes summarizing portions of a software bundle 280 can be stored on the peripheral device storage 240. The set of hashes can be used to verify the integrity of cached portions of a software bundle 280 within the peripheral device storage 240 or in the host device memory 298. Additionally, the launcher 310 can periodically check for new versions of each software bundle 280.

Symbiont Enumerator

The symbiont enumerator 320 ("enumerator"), is a software component in the SSD platform software 230 which can be located on a peripheral device 210. In some implementations, the enumerator 320 can determine which software bundles 280 provide a functionality the user needs for a particular use of the peripheral device 210. As shown in FIG. 1A, the enumerator 320 determines that one or more software bundles 280 are needed by identifying 130 one or more host device 220 capabilities and one or more peripheral device 210 capabilities.

Based on available resources 270 (e.g., resources available within the peripheral device 210 or through the network), functionalities 295 (e.g., functionalities available upon the host device 220 using host device 220 hardware and software), or identified host device 220 and peripheral device 210 capabilities, the enumerator 320 can also provide 140 a list of one or more additional software bundles 280 representing one or more particular use cases. In some implementations, the list can include additional peripheral device-specific software (e.g., updates). In one implementation, the peripheral device storage 240 can be updated based upon the selection and implementation of the one or more additional software bundles 280 or additional peripheral device-specific software. In one implementation the list can be provided to the launcher 310 (e.g., for display to the user).

The enumerator 320 can create the list by collecting a variety of information including available computing resources 270 (e.g., network access, 3D graphics acceleration, or a microphone), software bundles 280 contained in the peripheral device storage 240, software bundles 280 available from network sources (e.g., software bundles 280 not available in the storage 240 on the peripheral device 210), and software licenses. Software bundles 280 can include specifically defined requirements such that the enumerator 320 does not choose and attempt to run software which is non-functional or invalid (e.g., with respect to a particular use case).

For example, a software bundle 280 installed on a peripheral device 210 such as a smart webcam can include video chat software. If the host device 220 does not comprise speakers, a microphone, and a sound card, certain functionalities needed for particular use cases of the video chat software would not be enabled for the user (e.g., the ability to record and hear audio data). However, the software bundle 280 for the video chat software can also contain an additional security video recording software bundle 280. The additional security video recording software bundle 280 can include a use case for monitoring the web cam and saving compressed videos on the host device 220 that represent all instances of motion detected in the video. This additional security video recording software bundle 280 would not require speakers, a microphone, and a sound card. Thus, in this example, if the enumerator 320 detected a microphone and speakers on the host device 220, the enumerator 320 would consider both software bundles 280 valid, but if the host device 220 did not have a sound card, then only the additional security video recording software bundle 280 would be considered valid.

In some implementations, if network access is available, the enumerator 320 can identify software bundles 280 (e.g., new or updated), that can be downloaded from network sources (e.g., the Internet or intranet). The enumerator 320 checks predefined, user-defined, or discoverable network servers for available software bundles 280. If the host device 220 is capable of properly executing the available software bundles 280 (e.g., by meeting the software bundle 280 requirements for one or more use cases), these software bundles 280 can be added to the peripheral device storage 240. Additionally, the enumerator 320 can initially identify and download any update to software bundles 280 already present in the peripheral device storage 240.

Figure 4:
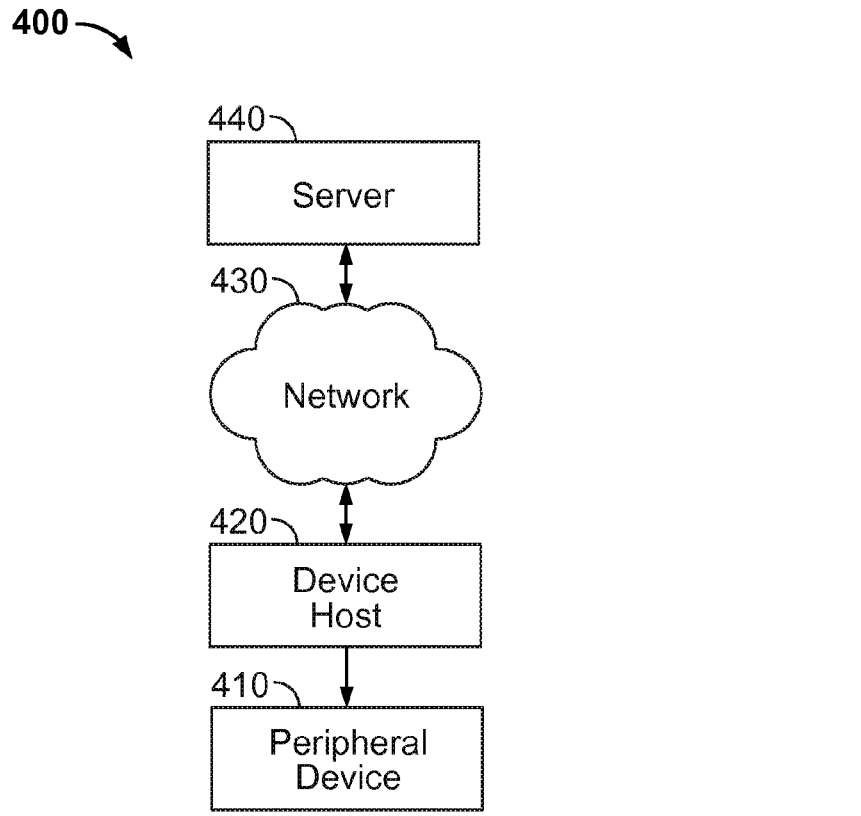
FIG. 4 illustrates an example network configuration for a system including an SSD.

FIG. 4 illustrates an example network configuration for a system 400 including an SSD or peripheral device 210. In FIG. 4, the enumerator 320 in the SSD platform software 230 can be located in the peripheral device storage 240 on the peripheral device 410. The enumerator 320 can transmit a request for available software through the network 430. The request can be transmitted to an Internet server 440 and the Internet server 440 can transmit available software through the network 430 back to the enumerator 320 for use on the host device 420. In some implementations, the ability to acquire software from remote resources can be used to allow a peripheral device 210 with limited storage 240 the ability to provide an extended set of functionalities to the user (e.g., by using Internet storage containing additional software). In other implementations, the ability to acquire software from remote resources can be used to distribute new software that can be downloaded to the peripheral device storage 240.

In some implementations, if Digital Rights Management ("DRM") technology is included in the peripheral device 210, then the enumerator 320 can validate which software is licensed for the user. As DRM technology can apply certain restrictions associated with particular peripheral devices 210, a manufacturer can make two different versions of a peripheral device 210 (e.g., a game controller), that differ in software only. For example, the first version of the software can include only free games, thus no software licenses need to be added to the peripheral device 210. The second version of the software can cost more, but the second version can also come with additional functionalities (e.g., a classic shooter game or a brand new online shooter that has not been released). The licenses for the software can be added to the peripheral device 210 when the software bundle 280 containing the software is available from the Internet. Additionally, in some implementations, a peripheral device 210 will automatically be able to play a game based on the version and respective license associate with the game.

As noted above, the enumerator 320 can determine the validity of a particular software bundle 280 with respect to a particular use case for that software bundle 280. Additionally, in some implementations, the enumerator 320 can determine a valid set (e.g., a list) of use cases for a peripheral device 210 once the peripheral device 210 is attached to a host device 220. For example, the enumerator 320 can initially populate a list of use cases based on software bundles 280 contained in the peripheral device storage 240 (e.g., from a file containing a list of use cases). The enumerator 320 can also amend the list of use cases to include use cases for software bundles 280 available from a set of predefined, user-defined, or discoverable local network servers. For example, the enumerator 320 can download a list of use cases for software bundles 280 from a preset local http server, or use Bonjour to discover local web servers and download lists of use cases for software bundles 280 from the local web servers. In some implementations, the enumerator 320 can append to the list of use cases, additional use cases for software bundles 280 that are available from a set of internet servers, distributed internet storage, or peer-to-peer sources (e.g., HTTP servers or Really Simple Syndication ("RSS") web feed formats).

In some implementations, the enumerator 320 can filter the list of available uses based on functionalities available on the host device 220 (e.g., Internet access or a sound output device). Additionally, in other implementations, the enumerator 320 can limit the list of available uses based on licensing agreements (e.g. free software, a license for software that enables the use case, a license tied to the portable storage device, a license tied to the host, or the existence of a network license). In some implementations, the list can be used to enable functionalities made available by particular site licensing agreements. In other implementations, the list can be used to allow a peripheral device 210 with limited storage 240 to provide an extended set of functionalities (e.g., using network storage containing software with an extended set of functionalities).

Symbiosis Relocator

The symbiosis relocator 330 ("relocator") is a software component in the SSD platform software 230 that can be located on a peripheral device 210. The relocator 330 is a virtualization component (e.g., LivePC Engine, VMPlayer®, Ceedo™, or Softricity™), which can facilitate the execution of a software bundle 280 in isolated environments. In one implementation, a software bundle 280 utilizing one or more additional resources 270 or functionalities 295 are executed on a host device 220 using the relocator 330 and the launcher 310. As noted above, this interaction is shown in FIG. 2C and can include virtualizing the resources, directly using the resources, and emulating other resources using available resources.

The relocator 330 is capable of making a software bundle 280 function as if it were installed on the host device 220, without actually installing the software bundle 280 on the host device 220. In one implementation, the relocator 330 can enable a legacy application (e.g., an existing or unmodified application that requires an installation program to run), to be bundled without modification. In one implementation, if the virtualization is done at the machine level (e.g., LivePC Engine, VMPlayer, Parallels Desktop), the relocator 330 can facilitate the loading of custom drivers for the peripheral device 210 hardware. In another implementation, if the virtualization is done at the machine level, the relocator 330 can facilitate the distribution of a complete software stack with the peripheral device 210 and specific to the peripheral device 210. Additionally, in another implementation, if the virtualization is done at the machine level, the relocator 330 can allow the software bundles 280 to run on the host device 220 even when no other software is located on the host device 220.

In some implementations, the relocator 330 can facilitate the execution of the software bundles 280 and peripheral device-specific software from the peripheral device storage 240. In one implementation, the relocator 330 can execute 150 a software bundle 280 or peripheral device-specific software utilizing one or more additional resources 270 or functionalities 295 on the host device 220. Additionally, the relocator 330 can present a standardized view of the SSD platform resources (e.g., network access through the peripheral interface 250, user storage 290, or computing resources 270), to a software bundle 280. The relocator 330 can also allow a software bundle 280 to run while the software bundle 280 is still downloading by simultaneously requesting required data from the downlink 350 and pausing the software bundle 280 until the data is available. For existing software bundles 280 that require installation prior to execution on the host device 220, the relocator 330 can facilitate execution of the software bundle 280 by creating the perception that the software bundle 280 is already installed on the host device 220.

Symbiosis Selector

The symbiosis selector 340 ("selector") is a software component in the SSD platform software 230 which can be located on a peripheral device 210. The selector 340 is a user interface component that allows the user to select a particular way to use the peripheral device 210 (e.g., with respect to the software bundles 280). In one implementation, the selector 340 can present one or more software bundles 280 to the user (e.g., in a user interface). In one implementation, the selector 340 can present an optimized view of use cases (e.g., for one or more software bundles), that highlights (e.g., by location, appearance, or initial visibility), the choices a user has frequently selected. In another implementation, the selector 340 can display a view of use cases (e.g., for one or more software bundles) that indicates (e.g., by location, appearance, or initial visibility), how fast the software for the use case can be downloaded (e.g., if it is not cached on the peripheral device storage 240).

In some implementations, after the enumerator 320 has determined which software bundles 280 are appropriate for the system (e.g., the peripheral device 210 and the host device 220), the selector 340 can facilitate the execution of a software bundle 280 on the host device 220. The selector 340 can automatically start a particular software bundle 280 (e.g., if that software bundle 280 is the only one available or if the user only uses one software bundle 280). If a peripheral device 210 serves more than one purpose, the selector 340 can present a user interface to the user which shows the user which software bundles 280 are available for which uses on the peripheral device 210. The user can then select one or more software bundles 280 as needed.

New software bundles 280 that require licenses can also be presented by the selector 340 and purchased directly by the user using the user interface. In some implementations, if an unlicensed option exists, the selector 340 can indicate the cost to license any unlicensed options in addition to the available use cases for the unlicensed options. Additionally, the selector 340 can provide a mechanism to purchase a license for a use case securely over the network 430 (e.g., from a remote server 440 over the Internet). In some implementations, after a license is purchased, the license can be automatically attached to the peripheral device 210. In other implementations, the license can optionally be activated (e.g., in advance), for use with a host device 220.

Symbiosis Downlink

In some implementations, the SSD platform software 230 can include a symbiosis downlink 350 ("downlink"), which is a software component in the SSD platform software 230 capable of identifying and downloading new or updated software bundles 280 from the network 430 (e.g., Internet storage), onto the peripheral device storage 240. The downlink 350 can download software from authoritative and peer-to-peer sources (e.g., HTTP, bittorrent, etc). The downlink 350 can download a complete software bundle 280 (e.g., code and data), prior to making the software bundle 280 available for execution. In one implementation, the downlink 350 can dynamically download portions of the software bundle 280 as needed during execution. In one implementation, the downlink 340 can download new data in the background such that the existing content can be used during the download. For example, a software bundle 280 can dynamically request the data it needs from the downlink 350 such that the software bundle 280 can be executed prior to being fully downloaded.

Symbiosis Personalizer

In some implementations, the SSD platform software includes a symbiois personalizer 360 ("personalizer"). The personalizer 360 is a software component in the SSD platform software 230 that can provide user-specific storage as part of the peripheral device storage 240. For example, the personalizer 360 facilitates the availability of user-created content (e.g., content created using the software bundle 280), within the system. Thus, when a user creates content using a software bundle 280, that content remains available to the user (e.g., for later use). In one implementation, the personalizer 360 can facilitate the storage and sharing of configuration data (e.g., settings), and convenience features (e.g., voice recognition training data or field auto-completions), between software bundles 280. In one implementation, the personalizer 360 can also facilitate the back-up and storage of user-created data in the user data storage 290. For example, the personalizer 360 can provide a standard framework (e.g., a global registry of data), for storing and managing user data. In one implementation, the personalizer 360 can also maintain a set of active software licenses for the user.

Figure 5A:
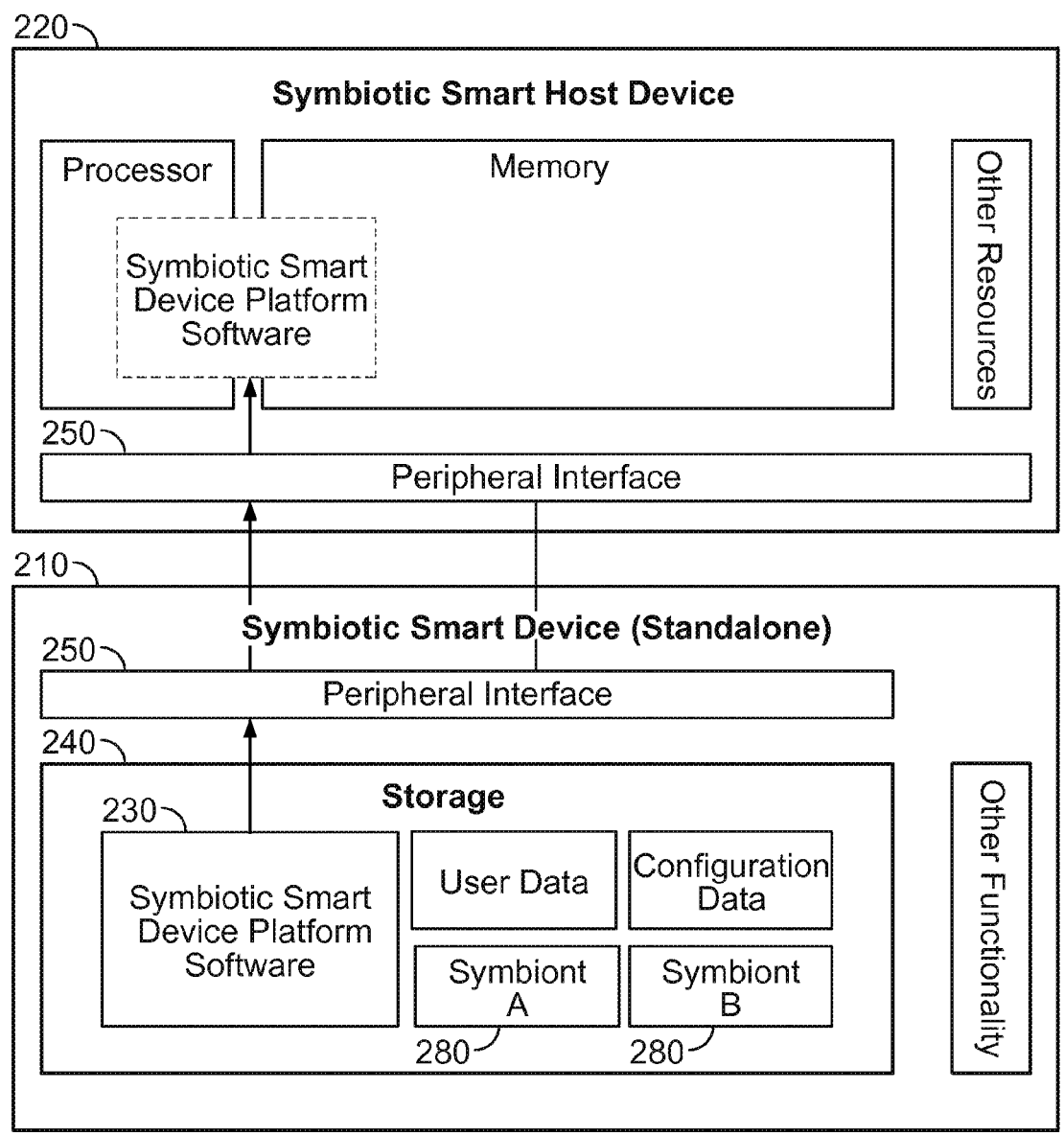
FIGS. 5A-5C illustrate a concept for a standalone SSD.
Figure 5B:
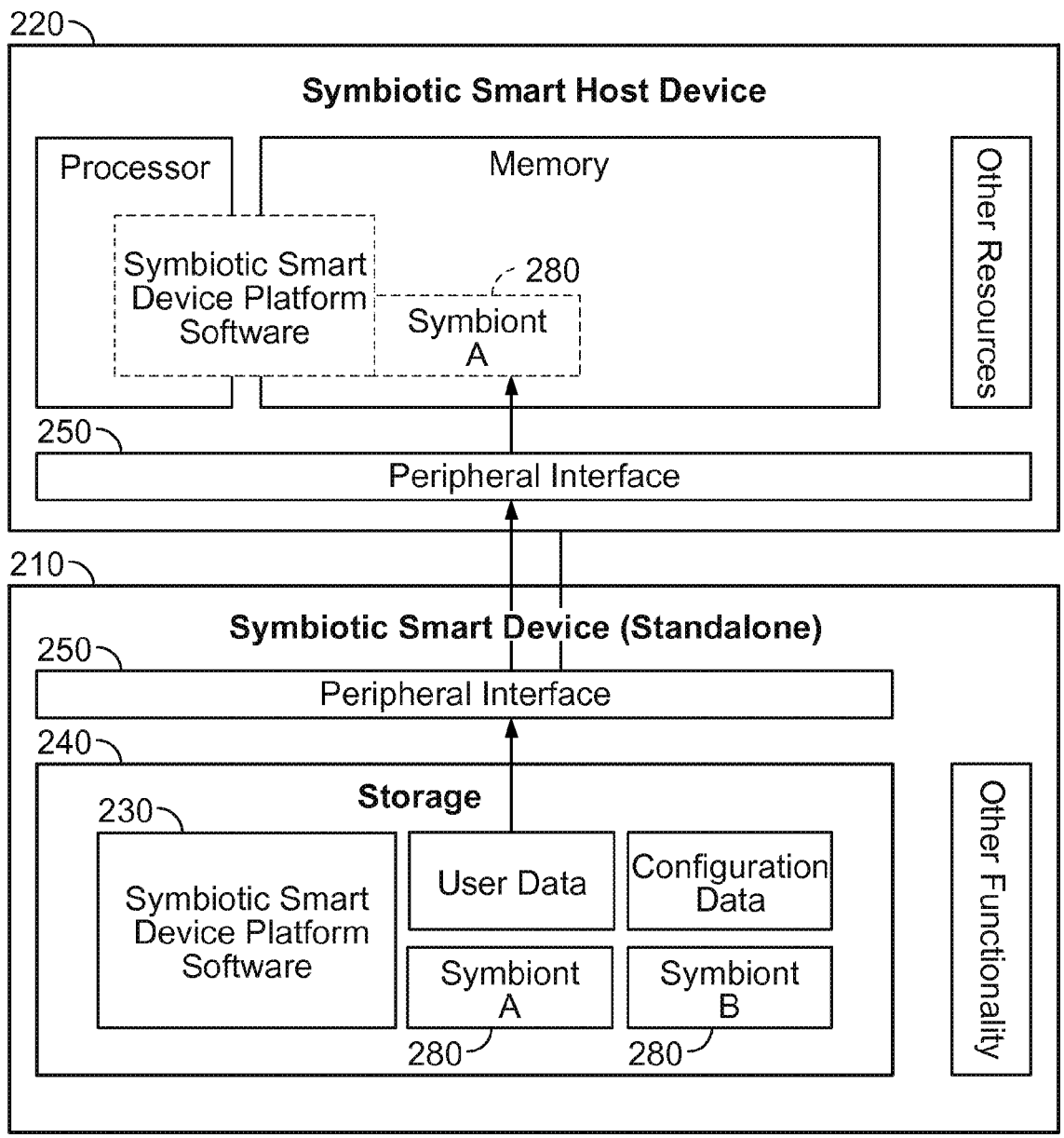
Figure 5C:
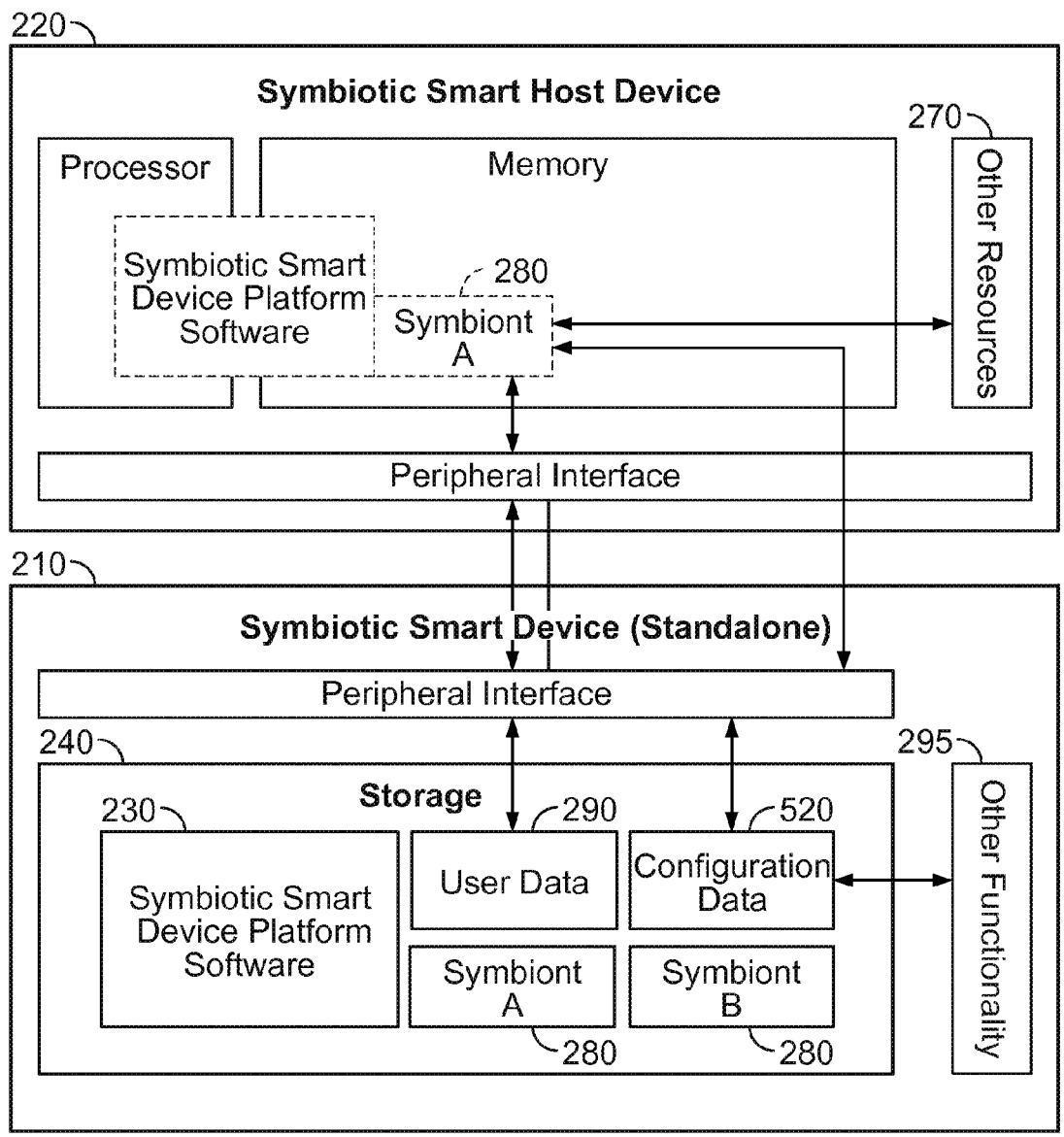

FIGS. 5A-5C illustrate a concept for a standalone peripheral device 210 in accordance with one implementation of the invention. As noted in FIG. 5A, a peripheral device 210 is attached to a host device 220, and the SSD platform software is loaded from the peripheral device storage 240. The SSD platform software 230 can then load a particular software bundle 280 onto the host device 220 using the peripheral interface 250, as shown in FIG. 5B. Finally, as shown in FIG. 5C, the software bundle 280 can execute on the host device 220 while simultaneously interacting with user data 290, configuration data 520, resource data 270 and functionality data 295. Once the peripheral device 210 is disconnected from the host device 220, the peripheral device 210 can continue to use the peripheral device storage 240.

For example, based on the configuration data 520 of an updated software bundle 280, the peripheral device 210 can modify its own behavior. As noted above, user data 510 can be stored using a standardized format such that software bundles 280 can edit the user data store 510. For example, the user data store 510 can be a repository of information for other software bundles 280 to reference when interpreting user input. For a standalone peripheral device 210 (e.g., a device which does not necessarily need to be attached to a host device 220), the user data store 510 can serve as a repository of configuration information for the peripheral device 210 when it is not connected to a host device 220.

In one implementation, the personalizer 360 can facilitate the storage (e.g., in a standard file-system hierarchy), of user-created bulk data such that the user-created bulk data (e.g., scores, statistics, music), can be shared between all software bundles 280. The user created bulk data along with the other user data 510 on the peripheral device 210 can be automatically backed up (e.g., on the network server 440 when a network connection is available), as the user created bulk data is being written to the peripheral device storage 240. If network backup is unavailable or undesirable, the personalizer 360 can create a backup on the host device 220 when the peripheral device 210 is attached to the host device 220.

The personalizer 360 can facilitate access to the contents of the user data store 510 in the peripheral device storage 240. In one implementation, the software bundles 280 can provide contextual data (e.g. a common recent document history, one or more field completions, a personal dictionary modification, or a PIM), by accessing and adding information in the user data store 510. In one implementation, the personalizer 360 can facilitate the placement of specific information from a software bundle 280 onto a peripheral device 210 (e.g., information important for a peripheral device 210 standalone functionality).

Figure 6:
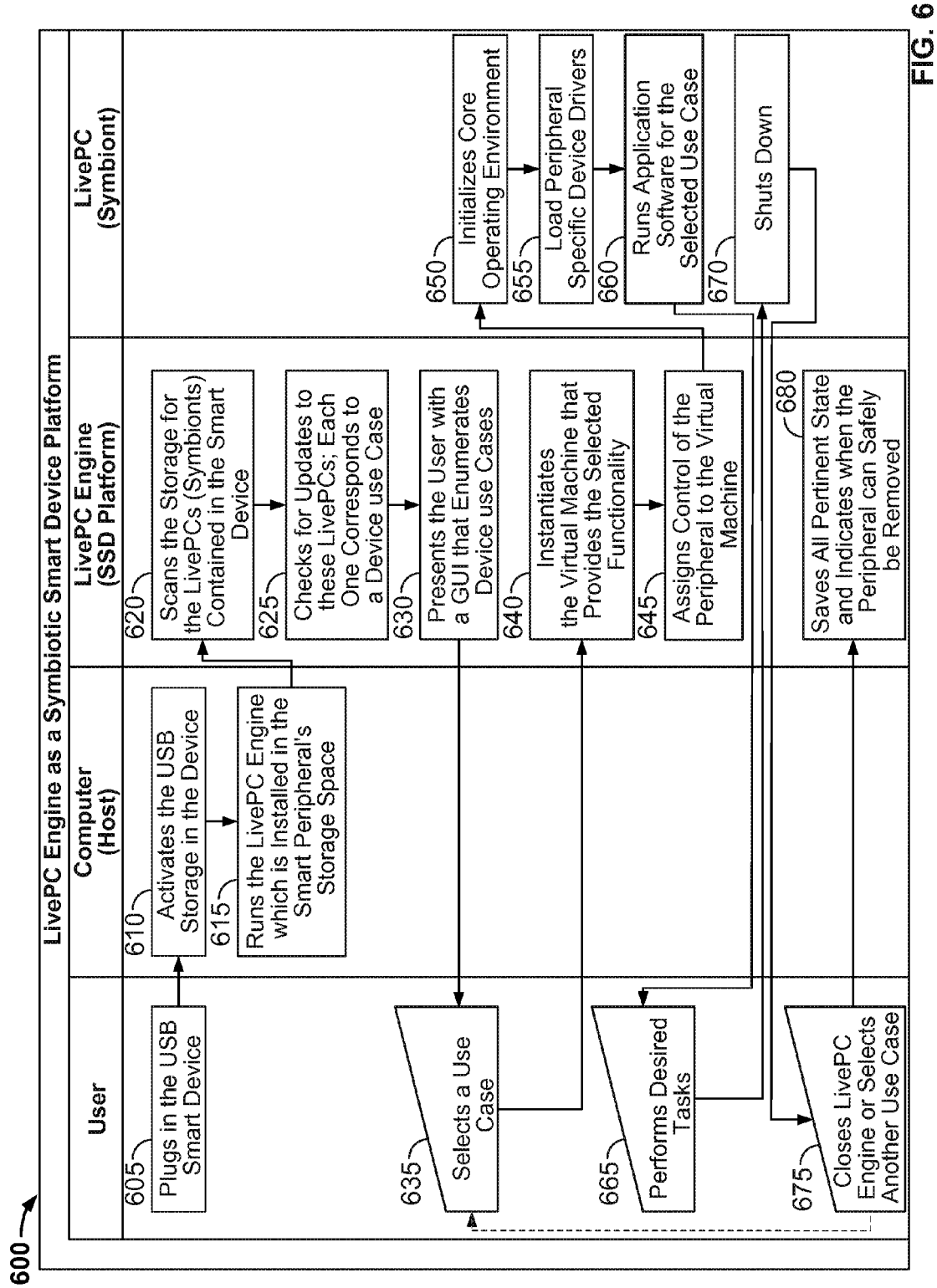
FIG. 6 illustrates an example relationship between the system components.

FIG. 6 illustrates the relationship between the system components 600 in accordance with one implementation of the invention. Although the SSD platform software 230 and software bundles 280 execute on the host device processor 260, they are treated as separate entities for clarity. As illustrated in FIG. 6, a LivePC Engine (like that manufactured and distributed by Moka5 of Redwood City, Calif. and available from http://www.moka5.com), can be implemented as SSD Platform software 230. Likewise, a LivePC (like that manufactured and distributed by Moka5 of Redwood City, Calif. and available from http://www.moka5.com), can be implemented as a software bundle 280.

In one implementation, a user can attach 605 (e.g., plug-in) the peripheral (or "smart") device 210 to a device (computer) host 220 using a universal serial bus ("USB"). When the peripheral device 210 is attached to the host device 220, the host device 220 can activate 610 the USB (peripheral device) storage 240 and run 615 (or execute) the LivePC Engine (the SSD platform software 230) installed in the peripheral device storage 240. The LivePC Engine can then scan 620 the peripheral device storage 240 for the LivePCs (software bundles 280) contained within the peripheral device 210. The LivePC Engine then checks 625 for updates to each LivePC. The LivePC Engine can then present 630 a graphical user interface ("GUI") to the user which enumerates one or more device use cases.

Upon receiving the GUI from the LivePC Engine, the user can select 635 a use case. After the user has chosen a use case, the LivePC Engine can instantiate 640 the virtual machine (software bundle 280) that provides the selected functionality (or use case). The LivePC Engine can then assign 645 control of the peripheral device 210 to the virtual machine (software bundle 280). The virtual machine or LivePC (software bundle 280) initializes 650 a core operating environment on the host device 220. The LivePC additionally loads 655 one or more peripheral device drivers which are specific to the attached peripheral device 210 and runs 660 (or executes) the application software (software bundle 280) for the selected use case.

When the application software is run, the user is able to perform 665 the desired task (e.g., a task specific to the peripheral device 210). Upon completion of the desired task, the LivePC (software bundle 280) can shut down 670 and the user can close 675 the LivePC Engine or optionally select another use case. Additionally, the LivePC Engine can save 680 all pertinent state information and can indicate to the user when the peripheral device 210 can be safely removed from the host device 220.

Prototype USB Implementation

Figure 7:
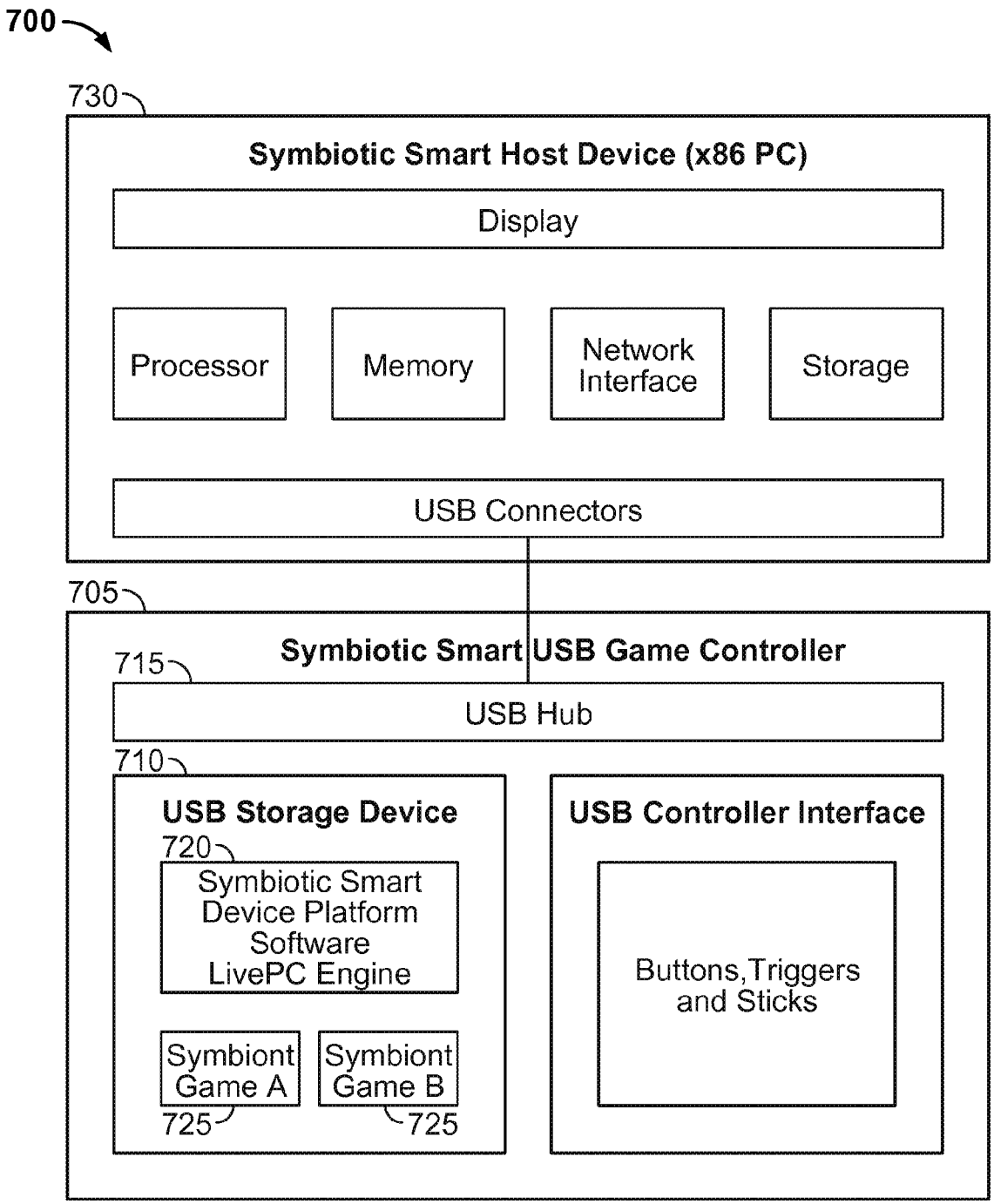
FIG. 7 illustrates an example system showing how the Moka5 LivePC Engine acts as an SSD platform.

FIG. 7 illustrates a system 700 showing how the Moka5 LivePC Engine (noted above) acts as SSD platform software 230 in accordance with one implementation of the invention. A USB SSD 705 (peripheral device), can be created by embedding a USB storage device 710 together with a USB hub 715 inside a separate additional USB device 705 (e.g., a game controller). In one specific embodiment, a symbiotic smart device 705 can include a video game controller with embedded storage (e.g., as modified using standard soldering techniques).

A Moka5 LivePC Engine 720 is installed in the peripheral device storage 710. The LivePC Engine 720 provides features of the SSD platform software which can include the software components described above. Specifically, the SSD platform software can include a launcher (e.g., to automatically start when USB storage is plugged in). The LivePC Engine 720 also can include an enumerator (e.g., to scan the storage for the installed LivePCs 725 (software bundles)). The LivePC Engine 720 can include a selector (e.g., to present a user interface allowing a user to select a particular software bundle 725 to execute). The LivePC Engine 720 can include the downlink (e.g., to automatically download updates, even during runtime). The LivePC Engine 720 can include a personalizer, (e.g., to share and backup user data). Finally, the LivePC Engine 720 can include a relocator, (e.g., to allow the LivePC Engine to run directly from device storage 710 when using machine virtualization).

The symbiotic smart device 705 can include a set of video games that are installed on individual LivePCs 725 (e.g., as software bundles). Each of the video games can be pre-configured to optimally use the SSD game controller 705, (e.g., by including the pre-installation of the required controller drivers and the pre-assignment of actions to buttons for the specific games). The LivePCs 725 can be packaged and uploaded over the network 430 to a network server (e.g., network server 440). The network paths to the LivePC packages can then be registered with the LivePC Engine 710 embedded in the SSD game controller 705. The SSD game controller 705 can be connected to a host device 730 (e.g., a personal computer) and the LivePC Engine 720 can be automatically initialized upon connection to the host device 730. A list of the software bundles 725 (LivePCs or symbionts) can be displayed in the SSD game controller storage 710. The software bundles 725 can be launched from the SSD game controller 705 on many different host device 730 machines.

Each time the software bundles 725 (LivePC game images) are started, the game software is capable of being played without any special configuration.

Specific Applications of Symbiotic Smart Devices

There are a wide variety of specific uses for symbiotic software devices which can be categorized by device type. The types of data which can be updated generally on any device for any use can include security data (and related security application data), generic software updates, and any user interface improvements. Any host device could require the capability of connecting to a network in order to download any necessary software updates.

Particular use cases can include, but are not limited to:

Portable storage devices, where the software included with the portable storage device can include a network file server, an Internet media downloader and player, or a network storage server. The types of data which can be updated on a portable storage device can include additional network protocol support. A host device would require the capability of connecting to a network in order to download any necessary software updates.

Child keyboard and mouse (e.g., with the ability to directly connect to a child-related network website), where the software included with the child keyboard or mouse can include video games appropriate for children and a web browser comprising a child-sensitive filter (e.g., capable of filtering out data inappropriate for children). A host device would require the capability of connecting to a network in order to download any necessary software updates. Additionally, a host device could optionally need other capabilities (depending on the game). These optional other capabilities can include hardware accelerated virtualization features, 3D acceleration, headset, video camera, and sound.

Game controllers, where the software included with the game controller can include additional video games, a console game emulator, or a PC video game platform. The types of data which can be updated on a game controller can include new levels proficiency for the user to accomplish within the game. A host device would require the capability of connecting to a network in order to download any necessary software updates. Additionally, a host device could optionally need other capabilities (depending on the game). These optional other capabilities can include acceleration, 3D acceleration, headset, video camera, and sound.

Headsets, where the software included with the headset can include a VoIP client, an Internet chat client, a voice enabled video game platform, or a virtual conference room. A host device would require the capability of producing sound in addition to the capability of connecting to a network in order to download any necessary software updates.

Headphones, where the software included with the headphones can include a music library manager and music player. A host device would require the capability of producing sound in addition to the capability of connecting to a network in order to download any necessary software updates.

Webcams, where the software included with the webcam can include an Internet video streaming server (e.g., a nannycam), an Internet video chat client, a motion/object detector, or security monitoring software (e.g., capable of sending audio, video or textual notices to a remote server). The types of data which can be updated on a webcam can include additional network protocols and additional audio or video codecs. A host device would require the capability of connecting to a network in order to download any necessary software updates. Additionally, a host device could optionally need other capabilities including the ability to reproduce sound.

Optical media drives, where the software included with the optical media drive can include media creation/recording software or media playback software (e.g., a DVD, an HD-DVD, or Blu-Ray Recording Software). The types of data which can be updated on an optical media drive can include additional network protocols and additional audio or video codecs. A host device could require the capability of reproducing sound (e.g., media recording software).

Musical instruments, where the software included with a musical instrument can include music composition software, a music recording environment, music games, or Internet jam session (e.g., the music version of an interactive Internet voice chat). The types of data which can be updated on a musical instrument can include new musical or instrumental samples, new sounds, new filters, new effects, new songs, or new levels of proficiency for the user to accomplish. A host device would require the capability of reproducing sound if the peripheral device required this functionality (e.g., an electric piano with built in speakers). Additionally, if the host device include better sound reproduction capabilities (e.g., better speakers), the host device sound reproduction capabilities can also be used.

Microphones, where the software included with the microphone can include a karaoke environment, voice print analysis software, or voice command recognition software. The types of data which can be updated on a microphone can include additional songs (e.g., for karaoke). A host device could require the capability of reproducing sound (e.g., for karaoke).

Television tuners, where the software included with the television tuner can include personal video recording software or a network video streaming server. The types of data which can be updated on a television tuner can include additional network protocols and additional audio or video codecs. A host device could require the capability of producing sound in addition to the capability of connecting to a network in order to download any necessary software updates.

Digital cameras, where the software included with the digital camera can include photo editing environments, web sharing software, photo album management software, and print ordering software.

Video cameras, where the software included with the video camera can include video editing software, video recording automation software, DVD production software, or video sharing software. The types of data which can be updated on a video camera can include additional network protocols and additional audio or video codecs. A host device would require the capability of connecting to a network in order to download any necessary software updates. Additionally, a host device could optionally need other capabilities including the ability to record and reproduce sound.

Stereo/audio receivers, where the software included with the stereo/audio receiver can include a graphical control module or Internet audio playback software.

Cellular phones, where the software included with the cellular phone can include contact data management and synchronization/tethering software or personal information management software (e.g., word processing or spreadsheet software), web browser software, or a complete virtual machine desktop.

Scanners, where the software included with the scanner can include document scanning software or optical character recognition software. The types of data which can be updated on a scanner can include additional file format support.

Printers, where the software included with the printer can include generic document viewers and printing software or network print server software. The types of data which can be updated on a printer can include additional file format support and additional network protocols. A host device would require the capability of connecting to a network in order to download any necessary software updates.

Personal health monitors, where the software included with the personal health monitor can include data recording software, data viewing software, data streaming software, or data alerting software (e.g., a blood-sugar monitor or a heart-rate monitor using health information management software capable of recording data for personal records and sending data to health care providers). The types of data which can be updated on a personal health monitor can include additional network protocols. A host device would require the capability of connecting to a network in order to download any necessary software updates.

Personal Identification Number ("PIN") pads, where the software included with the PIN pad can include secure password vault software. The types of data which can be updated on a PIN pad can include additional encryption algorithms.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard, a pointing device, e.g., a mouse or a trackball, or a musical instrument including musical instrument data interface (MIDI) capabilities, e.g., a musical keyboard, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Additionally, the invention can be embodied in a purpose built device, for example, one built for the on location recording of musical events, where the circuitry of the device contains firmware instructions for the editing procedures described above.

What is claimed is:

1. A method comprising:
   connecting a peripheral device to a host device through an interface, the peripheral device having memory including multiple software components, each software component operable to perform a function associated with the peripheral device;
   launching a virtual machine monitor for the peripheral device, the virtual machine monitor being launched on the host device;
   identifying one or more host device capabilities;
   generating a list of use cases available at the peripheral device based on said identifying, wherein the use cases are associated with the launched virtual machine monitor;
   presenting the list of use cases to a user at the host device;
   receiving a selection of a use case from the user;
   providing, at the host device, a set of software components from the peripheral device, wherein the provided set is associated with the selected use case; and
   executing, by the virtual machine monitor, the provided set of software components on the host device, thereby enabling the selected use case at the host device.

2. The method of claim 1, wherein providing the set of software components further involve:

identifying the set of software components in the peripheral device based on the identified one or more host device capabilities.

3. The method of claim 1, further comprising actions including:
    identifying and updating one or more software components stored in the peripheral device.

4. The method of claim 1, further comprising actions including:
    storing user-specific content and configuration data on the peripheral device.

5. A system comprising:
    an interface operable for coupling to a removable peripheral device;
    a processor; and
    a memory for storing instructions, which when executed by the processor, causes the processor to perform operations comprising:
        launching a virtual machine monitor for the peripheral device, the virtual machine monitor being launched on the host device;
        identifying one or more host device capabilities;
        generating a list of use cases available at the peripheral device based on said identifying, wherein the use cases are associated with the launched virtual machine monitor;
        presenting the list of use cases to a user at the host device;
        receiving a selection of a use case from the user;
        providing, at the hos device, a set of software components from the peripheral device, wherein the provided set is associated with the selected use case; and
        executing, by the virtual machine monitor, the provided set of software components on the host device, thereby enabling the selected use case at the host device.

6. The system of claim 5, wherein providing the set of software components further involves:
    identifying the set of software components in the peripheral device based on the identified one or more host device capabilities.

7. The system of claim 5, further comprising actions including:
    identifying and updating one or more software components stored in the peripheral device.

8. The system of claim 5, further comprising actions including:
    storing user-specific content and configuration data on the peripheral device.

9. A computer-program product tangibly embodied on a non-transitory computer-readable medium for storing instructions, which when executed by a processor of a host device, causes the processor to perform operations comprising:
    launching a virtual machine monitor for the peripheral device, the virtual machine monitor being launched on the host device;
    identifying one or more host device capabilities;
    generating a list of use cases available at the peripheral device based on said identifying, wherein the use cases are associated with the launched virtual machine monitor;
    presenting the list of use cases to a user at the host device;
    receiving a selection of a use case from the user;
    providing, at the host device, a set of software components from the peripheral device, wherein the provided set is associated with the selected use case; and
    executing, by the virtual machine monitor, the provided set of software components on the host device, thereby enabling the selected use case at the host device.

10. The computer-program product of claim 9, wherein providing the set of software components further involves:
    identifying the set of software components in the peripheral device based on the identified one or more host device capabilities.

11. The computer-program product of claim 9, further comprising actions including:
    identifying and updating one or more software components stored in the peripheral device.

12. The computer-program product of claim 9, further comprising actions including:
    storing user-specific content and configuration data on the peripheral device.

* * * * *

UNITED STATES PATENT AND TRADEMARK OFFICE
CERTIFICATE OF CORRECTION

| | | |
|---|---|---|
| PATENT NO. | : 8,601,470 B2 | Page 1 of 1 |
| APPLICATION NO. | : 11/970479 | |
| DATED | : December 3, 2013 | |
| INVENTOR(S) | : Kelvin Yue et al. | |

It is certified that error appears in the above-identified patent and that said Letters Patent is hereby corrected as shown below:

Title Page:

Item 75 please replace the third inventor's name "Thomas J. Purtell" with --Thomas J. Purtell II--.

Signed and Sealed this
Fifteenth Day of April, 2014

Michelle K. Lee
*Deputy Director of the United States Patent and Trademark Office*